(12) United States Patent
Borse et al.

(10) Patent No.: US 10,331,683 B2
(45) Date of Patent: Jun. 25, 2019

(54) DETERMINING RELEVANCY OF DISCUSSION TOPICS

(71) Applicant: International Business Machines Corporation, Armonk, NY (US)

(72) Inventors: Santosh S. Borse, Ossining, NY (US); Matthew Ganis, Carmel, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 542 days.

(21) Appl. No.: 15/144,362

(22) Filed: May 2, 2016

(65) Prior Publication Data

US 2017/0316009 A1 Nov. 2, 2017

(51) Int. Cl.
G06F 17/30 (2006.01)
G06F 16/2457 (2019.01)
G06F 16/9535 (2019.01)
G06F 16/951 (2019.01)

(52) U.S. Cl.
CPC ...... G06F 16/24578 (2019.01); G06F 16/951 (2019.01); G06F 16/9535 (2019.01)

(58) Field of Classification Search
CPC ........... G06F 17/30867; G06F 17/3053; G06F 16/24578
USPC .......................................................... 707/725
See application file for complete search history.

(56) References Cited

U.S. PATENT DOCUMENTS

| | | | |
|---|---|---|---|
| 7,783,620 B1* | 8/2010 | Chevalier | G06F 17/3053 707/706 |
| 8,489,515 B2 | 7/2013 | Mathur | |
| 2004/0039891 A1* | 2/2004 | Leung | G06F 16/10 711/165 |
| 2010/0107172 A1* | 4/2010 | Calinescu | G06F 9/5061 718/104 |
| 2014/0108130 A1* | 4/2014 | Vos | G06Q 30/0246 705/14.45 |
| 2014/0201203 A1* | 7/2014 | Krishna | G06F 16/24575 707/729 |
| 2014/0229291 A1 | 8/2014 | Schoen | |

(Continued)

FOREIGN PATENT DOCUMENTS

| | | |
|---|---|---|
| WO | 2013160904 A1 | 10/2013 |
| WO | 2014059319 A2 | 4/2014 |
| WO | 2014195958 A1 | 12/2014 |

OTHER PUBLICATIONS

Julia Skinner "Social Media and Revolution: The Arab Spring and the Occupy Movement as Seen through Three Information Studies Paradigms." AIS Electronic Library (2011) 28 pgs.

*Primary Examiner* — Shahid A Alam
(74) *Attorney, Agent, or Firm* — Cantor Colburn LLP; Kurt Goudy (57) ABSTRACT

Embodiments are directed to a computer implemented method of determining the relevancy of multiple sources. The method includes receiving a selection of one or more sources for monitoring. Thereafter, a relevancy factor can be assigned to each source. Data from one or more targets existing on each source can be gathered. In addition, a decay factor can be applied to the data to weight the data based on how recent the data is. The relevancy factor and the decay factor can be used to determine a relevancy score to determine the relevancy of the data. Other embodiments are also disclosed.

17 Claims, 4 Drawing Sheets

(56) References Cited

U.S. PATENT DOCUMENTS

2015/0149289 A1 5/2015 St. Clair
2016/0005084 A1 1/2016 Ryan

\* cited by examiner

FIG. 1

| | MONTH 3 | MONTH 2 | MONTH 1 | CURRENT MONTH | TOTAL |
|---|---|---|---|---|---|
| TOPIC A | 10 | 5 | 5 | 10 | 30 |
| TOPIC B | 5 | 5 | 7 | 10 | 27 |

FIG. 2

| | MONTH 3 | MONTH 2 | MONTH 1 | CURRENT MONTH | TOTAL |
|---|---|---|---|---|---|
| TOPIC A | 10 * 0.25 | 5 * 0.5 | 5 * 0.75 | 10 | 18.75 |
| TOPIC B | 5 * 0.25 | 5 * 0.5 | 7 * 0.75 | 10 | 19.00 |

DETERMINING RELEVANCY OF DISCUSSION TOPICS

BACKGROUND

The present disclosure relates in general to the field of data analysis. More specifically, the present disclosure relates to systems and methodologies for analyzing and determining the relevance of topics based on the location and timing of the discussion.

There is an increased desire for entities to analyze information from a variety of different sources. However, different sources have differing levels of credibility and/or importance. In addition, the credibility and/or importance of certain sources might lower over time. It would be desirable to utilize credibility and time to evaluate data sources.

SUMMARY

Embodiments are directed to a computer implemented method. The method includes receiving, using a processor system, a selection of one or more sources for monitoring and receiving, using the processor system, a relevancy factor for each source of the one or more sources. Thereafter, data is gathered that corresponds to one or more targets on each source of the one or more sources. The relevancy factor is applied to the data to determine a first relevancy score.

Embodiments are further directed to a computer system. The system includes a memory and a processor system communicatively coupled to the memory. The processor is configured to perform a method that includes receiving a selection of one or more sources for monitoring and receiving a relevancy factor for each source of the one or more sources. Thereafter, data is gathered that corresponds to one or more targets on each source of the one or more sources. The relevancy factor is applied to the data to determine a first relevancy score.

Embodiments are further directed to a computer program product. The computer program product includes a computer-readable storage medium having program instructions embodied therewith, wherein the computer-readable storage medium is not a transitory signal per se. The program instructions are readable by a processor system to cause the processor system to perform a method that includes receiving a selection of one or more sources for monitoring and receiving a relevancy factor for each source of the one or more sources. Thereafter, data is gathered that corresponds to one or more targets on each source of the one or more sources. The relevancy factor is applied to the data to determine a first relevancy score.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Various embodiments of the present disclosure will now be described with reference to the related drawings. Alternate embodiments may be devised without departing from the scope of this disclosure. Various connections might be set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

At least the features and combinations of features described in the present application, including the corresponding features and combinations of features depicted in the figures, amount to significantly more than implementing a method of analyzing data in a particular technological environment. Additionally, at least the features and combinations of features described in the present application, including the corresponding features and combinations of features depicted in the figures, go beyond what is well-understood, routine and conventional in the relevant field(s).

Example embodiments of the disclosure include or yield various technical features, technical effects, and/or improvements to technology. For instance, example embodiments of the disclosure provide the technical effect of evaluating the relevance of search results based on source of the results and a date of the results. This technical effect is achieved as a result of the technical features of receiving, using a processor system, a selection of one or more sources for monitoring and receiving, using the processor system, a relevancy factor for each source of the one or more sources. Thereafter, data is gathered that corresponds to one or more targets on each source of the one or more sources. The relevancy factor is applied to the data to determine a first relevancy score. In addition, by virtue of the technical features noted above, example embodiments of the disclosure also provide the technical effect of being able to determine relevancy based on an age of the result, which conventional methods are incapable of. As a result of the aforementioned technical features and technical effects, example embodiments of the disclosure constitute an improvement to existing computing resource management technology. It should be appreciated that the above examples of technical features, technical effects, and improvements to technology of example embodiments of the disclosure are merely illustrative and not exhaustive. By receiving and processing the data from various sources over a communications network, the example embodiments of the present disclosure, among other things, facilitate technical improvements to reducing network data traffic by identifying the relevance of the data sources to the one or more recipient entities receiving such data.

Many different types of entities compile data from many different sources (or targets). Some sources might be more important to a particular entity than other sources. For example, news sources might have different levels of relevance, with a well-known established newspaper such as the New York Times having a higher relevance than a tabloid, which might have a higher relevance than a blog. In addition, different entities can have different considerations of relevance. For example, while certain entities (such as politicians or celebrities or large corporations) might view the New York Times as having a higher relevance than a news site directed towards computers, a computer software manufacturer might view the news site directed towards computers as having more relevance. Similarly, a local business might view a local newspaper as having a higher relevance than a national newspaper.

Relevance is not necessarily limited to traditional news sites. Social media sites also might be considered as sources to be evaluated by different entities. For example, an advertiser might wish to direct its advertisements based on each target's interests. Thus, the social media postings of individual targets can be tracked to determine the interests of the targets. In such a case, one advertiser might consider a target's LinkedIn postings to be more relevant than the target's Facebook™ postings. Other advertisers might have different considerations of relevance and rank various platforms accordingly.

An entity may choose to rank various sources as higher in relevance than others. For example, an entity might view what is written on a first site (such as LinkedIn™) as three times more important than what is written on a second site (such as Facebook). In this example, an advertiser might be concerned with social media "mentions," i.e., the number of times a particular advertising target makes a reference to a certain product or category of products. Assume a target mentions "Topic A" 10 times on Facebook, but mentions "Topic B" 5 times on LinkedIn. Traditional methods might compute that, based on the target's current interest, Topic A is an appropriate advertisement to show to the target. However, because the entity views topics mentioned on LinkedIn as having three times more relevance than topics mentioned on Facebook, a weighted score might show Topic A as having a score of 10 (10 mentions times a relevance weight of 1), while Topic B has a score of 15 (5 mentions times a relevance weight of 3).

Timing can also be of concern to different entities. For example, the advertiser described above might be more interested in a target's postings within the last month than they are with the target's postings from two or three months prior. The same can be true of traditional news entities, where a review or article from three months ago might not have the same importance as a review from one week ago.

As described above, in one exemplary embodiment, an advertiser might be interested in measuring social media mentions made by each one of a plurality of targets. In some embodiments, the advertiser might be interested in directed advertising of individual targets. In some embodiments, the advertiser might be interested in a more general measure of the level of interest generated by an advertising campaign (e.g., to determine how much interest a Super Bowl commercial generated.)

Figure 1:
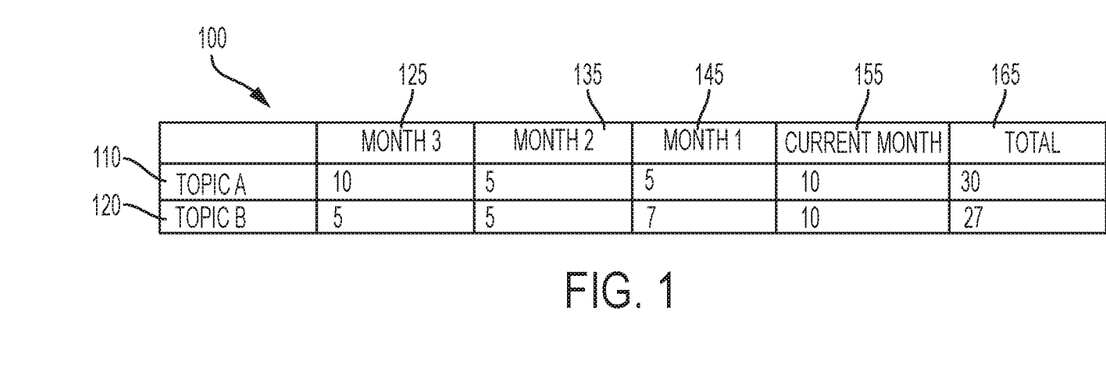
FIG. 1 depicts a table showing exemplary data to be processed.

FIG. 1 depicts a table 100, which illustrates an example of how data regarding the number of mentions of two topics (e.g., Topic A and Topic B) from a target can be organized according to one or more embodiments. The term "target" as used in the examples shown in FIGS. 1 and 2 refers to individuals and groups of individuals that may take a variety of forms, including an actual person (living or deceased), an existing or former group of actual people (living or deceased), an existing or former organization, a fictional person, a fictional group of people, a fictional organization, and an artificial agent having natural language processing capabilities. Assume that the target is a potential advertising target, and that the target discusses two topics over a four-month period as shown in table 100. Each entry in the table tabulates the number of times the target discussed Topic A in row 110 and Topic B in row 120. Columns 125, 135, 145, and 155 show how many times the topic was discussed each month, with month 1 (column 145) being 1 month in the past, month 2 (column 135) being 2 months in the past and month 3 (column 125) being 3 months in the past. The total number of times discussed over the all of the time periods is tabulated in column 165. Topic A was discussed 30 times over the 4-month period and Topic B was discussed 27 times over the 4-month period. Under a traditional tabulation scheme, these total amounts would be used to determine that the target is more interested in Topic A than Topic B.

Figure 2:
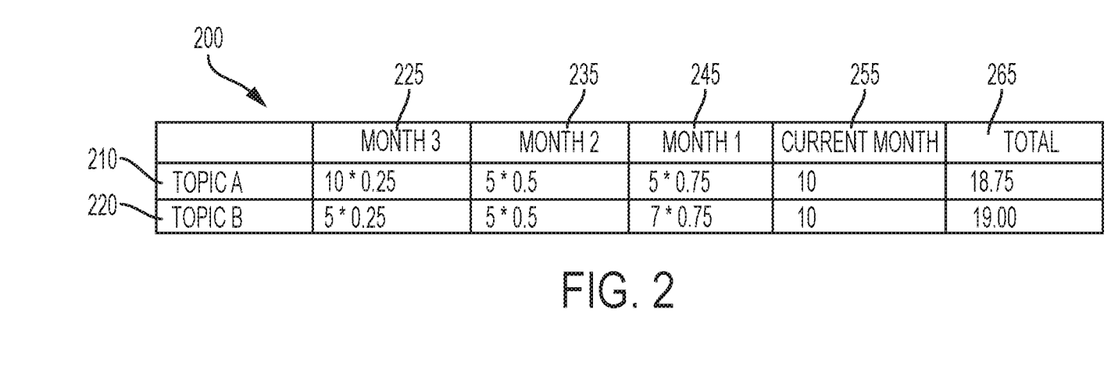
FIG. 2 depicts a table illustrating the operation of an embodiment on the previously shown exemplary data.

In some embodiments, there can be a weighting of the discussions based on the age of each discussion. An entity can decide that the relevancy of a conversation lowers by 0.25 (on a scale of 0 to 1.0) from month-to-month. In other words, the relevancy of discussions from the current month can be weighted at 1.0. The relevancy of discussions from the previous month can be weighted at 0.75. The relevancy of discussions from the month prior can be weighted at 0.50. The relevancy of discussions from the month prior can be weighted at 0.25. The results are shown in table 200 of FIG. 2. Table 200 shown in FIG. 2 presents data in a similar format as table 100 shown in FIG. 1. Rows 210 and 220 show the data for Topic A and Topic B respectively. Columns 225, 235, 245, and 255 show how many times the topic was discussed each month multiplied by the decay factor, with month 1 (column 245) being 1 month in the past, month 2 (column 235) being 2 months in the past and month 3 (column 225) being 3 months in the past. The total number of times discussed over the all of the time periods is tabulated in column 265.

Topic B becomes the more relevant topic through the weighting with a total relevancy of 19.00 compared to 18.75 of Topic A. The reason for this is the timing of the target's postings about Topic B, which are more plentiful in recent months. Thus, the advertiser in this example might be more likely to direct advertising related to Topic B to this target than Topic A.

It should be understood the meaning of "month" in the above example can be one of a variety of different meanings. For example, if the current date is April 15, in some embodiments, the "current month" can be anything from the month of April. In other embodiments, the "current month" can be from March 16 to April 15. In other embodiments, the "current month" can be measured as the previous 30 days.

It also should be understood that other durations of time can be used. While some entities might be interested in categorizing information in month-long increments, other entities might be interested in categorizing information by weeks or by days, or by hours, or by any other time period.

It also should be understood that other methods for allowing an entity to indicate relevance over time can be used. The above example describes using a system of assigning weights to each time period. In some embodiments, an exponential decay can be used. In some embodiments, a linear decay factor can be used. In some embodiments, a logarithmic decay factor can be used. In fact, any type of decay factor can be used. In other embodiments, each time period can be multiplied by a certain factor (between 0 and 1) to obtain a weighting. In other embodiments, any other type of system can be used to provide a weighting over time.

Figure 3:
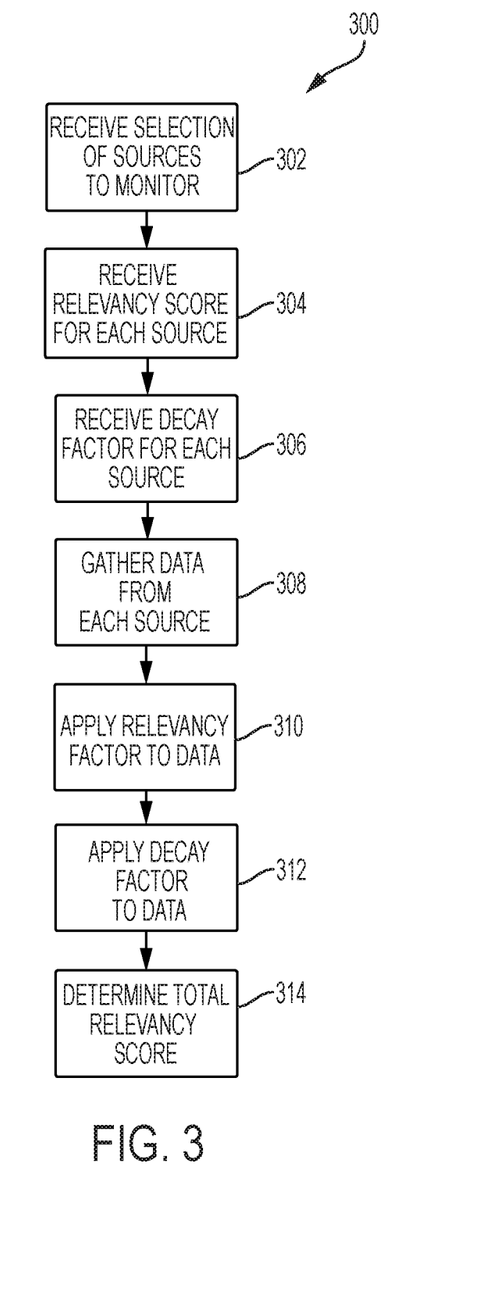
FIG. 3 depicts a flow diagram illustrating the operation of an embodiment.

A flowchart illustrating a method 300 is presented in FIG. 3. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, the procedures, processes, and/or activities of method 300 can be performed in any other suitable order. In still other embodiments, one or more of the procedures, processes, and/or activities of method 300 can be combined or skipped.

Method 300 might be performed by any entity that wishes to determine the relevancy of items from a variety of different sources in as quick and efficient a manner as possible. The entity can be any type of entity, such as an individual, a corporation, an organization, a group, a partnership, and the like, whether or not there is a legal entity involved. The entity chooses the sources it wishes to monitor (block 302). As previously noted herein, the sources can take a variety of different forms. In some embodiments, the sources might be referred to as targets. The sources might be a target's accounts on different social networks, such as Facebook™, LinkedIn™, and Twitter™. The sources might be a compilation of multiple accounts on different social networks (e.g., attempting to find trends on social networks). The sources might be a news source, such as newspapers, web sites, and the like. The sources can be a combination of different types of sources, including both newspapers and social networks as well as many other type of source. Other sources also can be used. After choosing the sources, the entity assigns a relevancy factor to each source (block 304). In some embodiments, the relevancy factor can be scaled such that the source with highest relevancy has a relevancy factor of 1.0 and all other sources have a factor greater than zero and less than or equal to 1.0. Note that multiple sources can have the same relevancy factor. In some embodiments, the relevancy factor can be zero, meaning anything from that source will be ignored.

The entity can then assign a decay factor for each source (block 306). As described above, the decay factor indicates how relevant a topic is relative over time. A simple example was given above with respect to FIG. 2, where the current month has a decay factor of 1.0, the month prior has a decay factor of 0.75, the month prior to that has a decay factor of 0.50, and the month prior to that has a decay factor of 0.25. As discussed above, other time periods (e.g., minutes, hours, days, weeks, quarters, years, etc.) also can be used.

The data from each source is then gathered (block 308). The data gathering can occur in a variety of different manners. In embodiments where the sources include social networks, a social network handle can be linked to a particular subject, such that the subject's social network handle for each of a variety to different social networks each can be associated to the appropriate subject. The number of mentions of a topic that is being monitored can be tabulated over the time period at issue.

For each source, the number of mentions of the topic is calculated and the relevancy factor is applied (block 310). In some embodiments, this result can be called the first relevancy score. This can involve multiplying the number of mentions by the relevancy factor. Other algorithms can be used, as described above.

For each time period, the decay factor can be applied to the number of mentions (block 312). In some embodiments, this result can be called the second relevancy score. In some embodiments, this can involve multiplying the number found in block 310 by the decay factor for each time period. In other embodiments, other algorithms, such as an exponential decay, can be used. The first relevancy score and the second relevancy score can be combined to determine a total relevancy score that can then be used by the entity in a variety of different manners (block 314). The combination of the first relevancy score and the second relevancy score can be done in a variety of different manners. In some embodiments, the first relevancy score can be added to the second relevancy score. In some embodiments, there can be a weighting applied to the first relevancy score and the second relevancy score. Other manners might also be used.

Thus, there are several different manners in which to produce a total relevancy score. The relevancy factor for each source can be used on the total mentions of the topic to determine the total relevancy. In this case, the blocks involving the time decay (block 312) might be skipped or ignored. In other embodiments, each time period can be assigned the same decay factor, such as 1.0, which might be functionally equivalent to skipping block 312.

The decay factor alone might be used for each time period to determine the total relevancy score. In this case, the blocks involving the relevancy factor of each source (block 310) can be ignored or skipped. In other embodiments, the same relevancy score can be assigned to each source, such as 1.0, which might be functionally equivalent to skipping block 310.

In a third manner, both the relevancy factor and the decay factor can be used to determine the total relevancy. In other words, none of the blocks are skipped.

Figure 4:
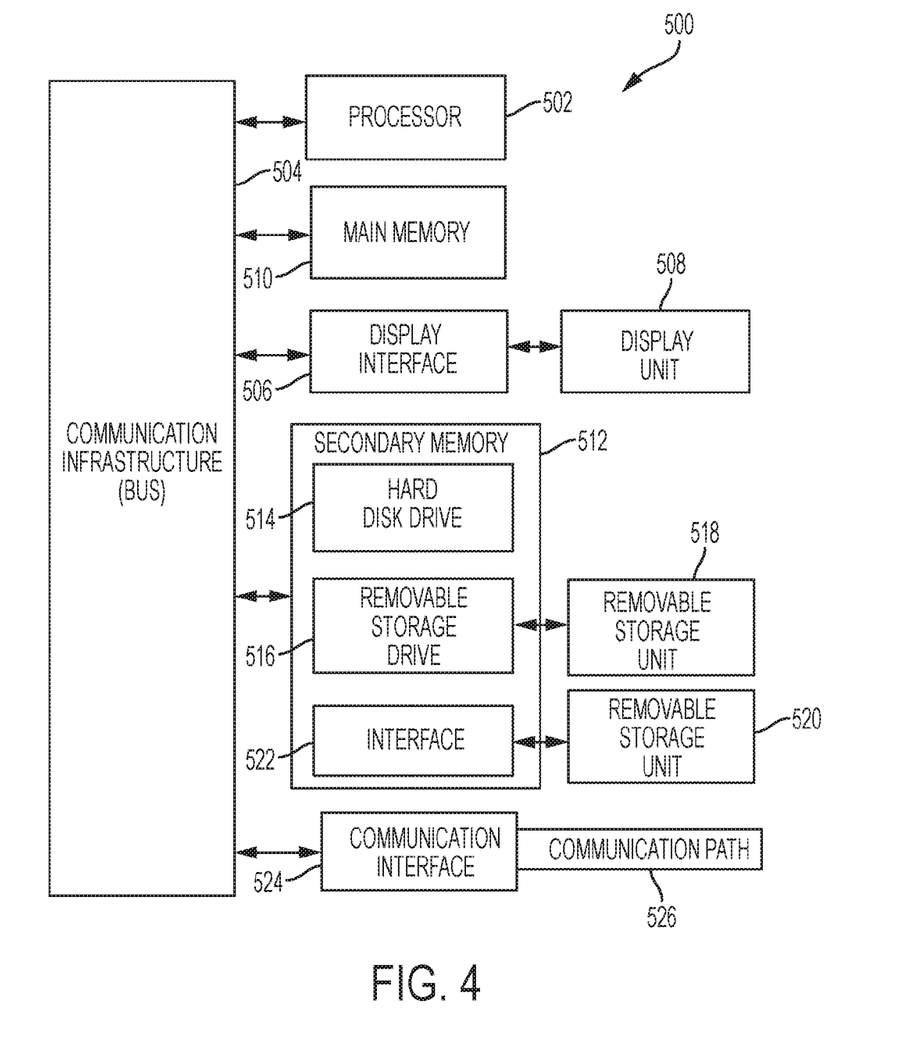
FIG. 4 depicts a computer system capable of implementing hardware components of one or more embodiments.

FIG. 4 depicts a high level block diagram computer system 500, which may be used to implement one or more embodiments of the present disclosure. More specifically, computer system 500 may be used to implement hardware components of systems capable of performing methods described herein. Although one exemplary computer system 500 is shown, computer system 500 includes a communication path 526, which connects computer system 500 to additional systems (not depicted) and may include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also may be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PC card slot and card, a universal serial bus port (USB), and the like. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present disclosure, the terms "computer program medium," "computer usable medium," and "computer-readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs may also be received via communications interface 524. Such computer programs, when run, enable the computer system to perform the features of the present disclosure as discussed herein. In particular, the computer programs, when run, enable processor 502 to perform the features of the computer system. Accordingly, such computer programs represent controllers of the computer system. Thus it can be seen from the forgoing detailed description that one or more embodiments of the present disclosure provide technical benefits and advantages.

Figure 5:
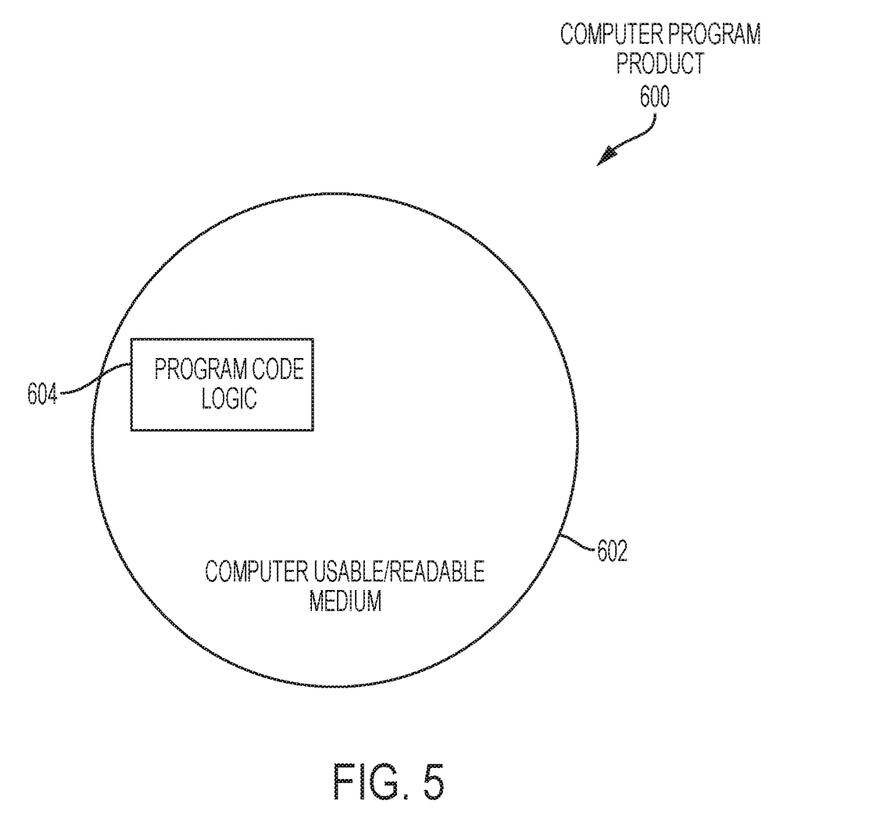
FIG. 5 depicts a diagram of a computer program product according to one or more embodiments.

Referring now to FIG. 5, a computer program product 600 in accordance with an embodiment that includes a computer-readable storage medium 602 and program instructions 604 is generally shown.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the entity's computer, partly on the entity's computer, as a stand-alone software package, partly on the entity's computer and partly on a remote computer or entirely on the remote computer or server. In the latter scenario, the remote computer may be connected to the entity's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method comprising:
   receiving, using a processor system, a selection of one or more sources of data for monitoring;
   for each source of the one or more sources of data, receiving, using the processor system, a relevancy factor and a decay factor;
   for each source of the one or more sources of data, gathering target data that corresponds to one or more targets;
   applying the relevancy factor to the data to determine a first relevancy score;
   applying the decay factor to the data to determine a second relevancy score;
   compiling, using the processor system, the first relevancy score and the second relevancy score to determine a total relevancy score; and
   reporting the total relevancy score.

2. The computer-implemented method of claim 1 wherein:
   at least one source from the one or more sources of data is a social media network; and
   gathering data comprises determining number of mentions on the social media network.

3. The computer-implemented method of claim 1 wherein:
   the relevancy factor comprises a number greater than or equal to 0 and less than or equal to 1 for each source of the one or more sources of data; and
   applying the relevancy factor comprises multiplying the data by the relevancy factor.

4. The computer-implemented method of claim 1 wherein:
   the decay factor comprises a number greater than or equal to 0 and less than or equal to 1 for each time period of a set of time periods; and
   applying the decay factor comprises multiplying the data by the decay factor for each time period of the set of time periods determine a second relevancy score.

5. The computer-implemented method of claim 4 wherein:
   each time period of the set of time periods is chosen from the set comprising: hours, weeks, months, quarters, and years.

6. The computer-implemented method of claim 1 wherein:
   the decay factor comprises a factor used in a decay function; and applying the decay factor comprises applying the decay function using the decay factor.

7. A computer system comprising:
a memory; and
a processor system communicatively coupled to the memory;
the processor system configured to perform a method comprising:
receiving a selection of one or more sources of data for monitoring;
receiving a relevancy factor and a decay factor for each source of the one or more sources of data;
gathering target data that corresponds to one or more targets on each source of the one or more sources of data;
applying the relevancy factor to the data to determine a first relevancy score;
applying the decay factor to the data to determine a second relevancy score;
compiling, using the processor system, the first relevancy score and the second relevancy score to determine a total relevancy score; and
reporting the total relevancy score.

8. The computer system of claim 7 wherein:
at least one source from the one or more sources of data is a social media network; and
gathering data comprises determining number of mentions on the social media network.

9. The computer system of claim 7 wherein:
the relevancy score comprises a number greater than or equal to 0 and less than or equal to 1 for each source of the one or more sources of data; and
applying the relevancy factor comprises multiplying the data by the relevancy factor.

10. The computer system of claim 7 wherein:
the decay factor comprises a number greater than or equal to 0 and less than or equal to 1 for each time period of a set of time periods; and
applying the decay factor comprises multiplying the data by the decay factor for each time period of the set of time periods determine the second relevancy score.

11. The computer system of claim 10, wherein:
each time period of the set of time periods is chosen from the set comprising: hours, weeks, months, quarters, and years.

12. The computer system of claim 7 wherein:
the decay factor comprises a factor used in a decay function; and
applying the decay factor comprises applying the decay function using the decay factor.

13. A computer program product comprising:
a computer-readable storage medium having program instructions embodied therewith, wherein the computer-readable storage medium is not a transitory signal per se, the program instructions readable by a processor system to cause the processor system to perform a method comprising:
receiving a selection of one or more sources of data for monitoring;
receiving a relevancy factor and a decay factor for each source of the one or more sources of data;
gathering target data that corresponds to one or more targets for each source of the one or more sources of data;
applying the relevancy factor to the data to determine a first relevancy score;
applying the decay factor to the data to determine a second relevancy score;
compiling the first relevancy score and the second relevancy score to determine a total relevancy score; and
reporting the total relevancy score.

14. The computer program product of claim 13 wherein:
at least one source from the one or more sources of data is a social media network; and
gathering data comprises determining number of mentions on the social media network.

15. The computer program product of claim 13 wherein:
the relevancy score comprises a number greater than or equal to 0 and less than or equal to 1 for each source of the one or more sources of data; and
applying the relevancy factor based on the relevancy score comprises multiplying the data by the relevancy score.

16. The computer program product of claim 13 wherein:
the decay factor comprises a number greater than or equal to 0 and less than or equal to 1 for each time period of a set of time periods; and
applying the decay factor comprises multiplying the data by the decay factor for each time period of the set of time periods determine a second relevancy score.

17. The computer program product of claim 16 wherein:
each time period of the set of time periods is chosen from the set comprising: hours, weeks, months, quarters, and years.

* * * * *